United States Patent
Pellizzon

(10) Patent No.: US 12,291,320 B2
(45) Date of Patent: May 6, 2025

(54) AIRCRAFT FLOOR COMPRISING A SEALING TARPAULIN, AND AIRCRAFT COMPRISING SAID FLOOR

(71) Applicant: Airbus Operations SAS, Toulouse (FR)

(72) Inventor: Sébastien Pellizzon, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 111 days.

(21) Appl. No.: 18/358,222

(22) Filed: Jul. 25, 2023

(65) Prior Publication Data

US 2024/0034456 A1 Feb. 1, 2024

(30) Foreign Application Priority Data

Jul. 26, 2022 (FR) ........................................ 2207640

(51) Int. Cl.
*B64C 1/18* (2006.01)
(52) U.S. Cl.
CPC ....................................... *B64C 1/18* (2013.01)
(58) Field of Classification Search
CPC ........................................................ B64C 1/18
See application file for complete search history.

(56) References Cited

U.S. PATENT DOCUMENTS

| 2010/0065686 A1* | 3/2010 | Tauscher | B64C 1/18 244/129.1 |
| 2013/0146709 A1* | 6/2013 | Bernadet | B64C 1/18 244/119 |
| 2019/0001167 A1* | 1/2019 | Sibello | F16J 15/065 |
| 2020/0094090 A1 | 3/2020 | Sibello et al. | |
| 2022/0234714 A1* | 7/2022 | Skilton | B29C 70/202 |

FOREIGN PATENT DOCUMENTS

| CN | 105923144 B | 8/2018 |
| EP | 2113456 A2 | 11/2009 |
| WO | 2018048946 A1 | 3/2018 |

OTHER PUBLICATIONS

French Search Report for corresponding French Patent Application No. 2207640 dated Feb. 14, 2023; priority document.

\* cited by examiner

*Primary Examiner* — Tye William Abell
(74) *Attorney, Agent, or Firm* — Greer, Burns & Crain, Ltd.

(57) ABSTRACT

An aircraft floor including a structure, a deck attached to the structure, and first and second sealing barriers superposed at least in line with a protection zone, the deck being configured to form the first sealing barrier at least in line with the protection zone. The second sealing barrier includes a sealing tarpaulin interposed between the deck and the structure and having several reinforcing strips fixed against a face of the sealing tarpaulin oriented toward the structure, at least some of the reinforcing strips being interposed between the sealing tarpaulin and longitudinal reinforcements of the structure of the floor.

7 Claims, 2 Drawing Sheets

AIRCRAFT FLOOR COMPRISING A SEALING TARPAULIN, AND AIRCRAFT COMPRISING SAID FLOOR

CROSS-REFERENCES TO RELATED APPLICATIONS

This application claims the benefit of the French patent application No. 2207640 filed on Jul. 26, 2022, the entire disclosures of which are incorporated herein by way of reference.

FIELD OF THE INVENTION

The present application relates to an aircraft floor comprising a sealing tarpaulin, and to an aircraft comprising said floor.

BACKGROUND OF THE INVENTION

According to one embodiment of the prior art, an aircraft comprises a fuselage and also a floor dividing the interior of the fuselage into an upper zone and a lower zone. According to one layout, the aircraft comprises an avionics bay, which is situated in the lower zone and in which electrical and electronic equipment is positioned, and also a toilet cabin, which comprises toilets and a sink and which is situated in the upper zone, above the avionics bay.

According to one configuration, the floor comprises a structure and juxtaposed panels, which are attached to the structure. Since the toilet cabin is a wet zone, in which water may spill to the ground, the assembly of juxtaposed panels forms a first sealing barrier. To limit any risk of liquid reaching the electrical and electronic equipment, the aircraft comprises a second sealing barrier.

According to a first embodiment, the second barrier comprises several rigid plates, which are spaced apart from the floor and cover the electrical and electronic equipment. This first embodiment is not optimal, since it may be difficult to implement when the avionics bay takes up a lot of space, and it causes a significant increase in the on-board mass.

According to a second embodiment, the second barrier comprises several rigid protective plates, which are interposed between the panels of the floor and the structure. This second embodiment is not optimal, since the protective plates significantly increase the on-board mass.

The present invention aims to remedy all or some of the disadvantages of the prior art.

SUMMARY OF THE INVENTION

To this end, the invention relates to an aircraft floor comprising a structure, a deck attached to the structure, and first and second sealing barriers superposed at least in line with a protection zone, the deck being configured to form the first sealing barrier at least in line with the protection zone, the structure of the floor having transverse beams which are oriented perpendicularly to a longitudinal direction and spaced apart from one another, and longitudinal reinforcements which are oriented parallel to the longitudinal direction, are spaced apart from one another and are attached to the transverse beams.

According to the invention, the second sealing barrier comprises a sealing tarpaulin interposed between the deck and the structure and having several reinforcing strips fixed against a face of the sealing tarpaulin oriented toward the structure, at least some of the reinforcing strips being interposed between the sealing tarpaulin and the longitudinal reinforcements of the structure of the floor.

The use of a sealing tarpaulin makes it possible to reduce the mass and the costs of the second sealing barrier in relation to the protective plates of the prior art.

According to other features taken singly or in combination:
  the reinforcing strips are rigid or semi-rigid;
  the sealing tarpaulin extends continuously over the entire protection zone;
  the sealing tarpaulin comprises at least one woven ply coated with a plastic material.

According to another feature, at least one reinforcing strip comprises through-holes.

The invention also relates to an aircraft comprising a floor according to one of the preceding features.

According to another feature, the aircraft comprises an avionics bay situated below the floor, the protection zone being situated above the avionics bay.

BRIEF DESCRIPTION OF THE DRAWINGS

Further features and advantages will become apparent from the following description of the invention, given solely by way of example and with reference to the appended drawings in which.

DETAILED DESCRIPTION OF THE PREFERRED EMBODIMENTS

Figure 1:
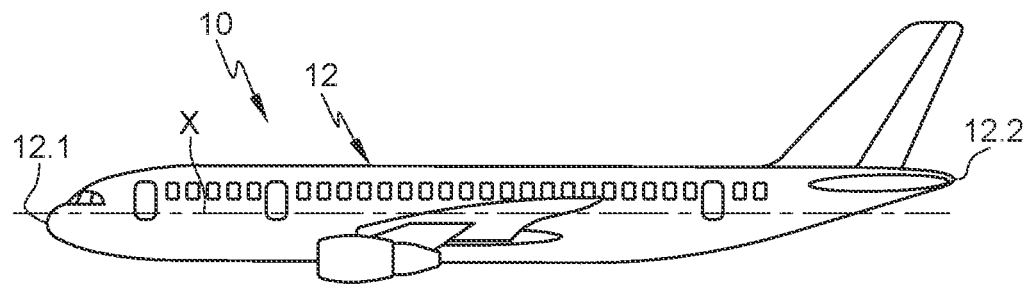
FIG. 1 is a side view of an aircraft.

According to an embodiment that can be seen in FIGS. 1 to 3, an aircraft 10 comprises a fuselage 12, which extends between a nose cone 12.1 and a tail cone 12.2, and also a floor 14, which delimits, within the fuselage 12, an upper zone 16.1 situated above the floor 14 and a lower zone 16.2 situated below the floor 14.

In the remainder of the description, a longitudinal direction X corresponds to a direction which passes approximately through the nose cone 12.1 and the tail cone 12.2 and which is substantially horizontal when the aircraft is on the ground. A transverse plane is a plane perpendicular to the longitudinal direction.

According to one layout, the upper zone 16.1 of the fuselage 12 comprises, in the direction from the nose cone 12.2 to the tail cone 12.2, a cockpit 18, an intermediate zone 20 and a passenger cabin 22. The intermediate zone 20 comprises, among other things, a toilet cabin 20.1 in which toilets and a sink, for example, are provided.

In the direction from the nose cone 12.1 to the tail cone 12.2, the lower zone 16.2 comprises a landing gear bay 24, an avionics bay 26 and a luggage bay 28. The avionics bay 26 comprises, among other things, electrical and electronic equipment.

According to this layout, the intermediate zone 20 is situated at least partially above the avionics bay 26.

Of course, the invention is not limited to this layout.

According to one embodiment, the floor 14 comprises a structure 30 and a deck 32 attached to the structure 30.

Figure 4:
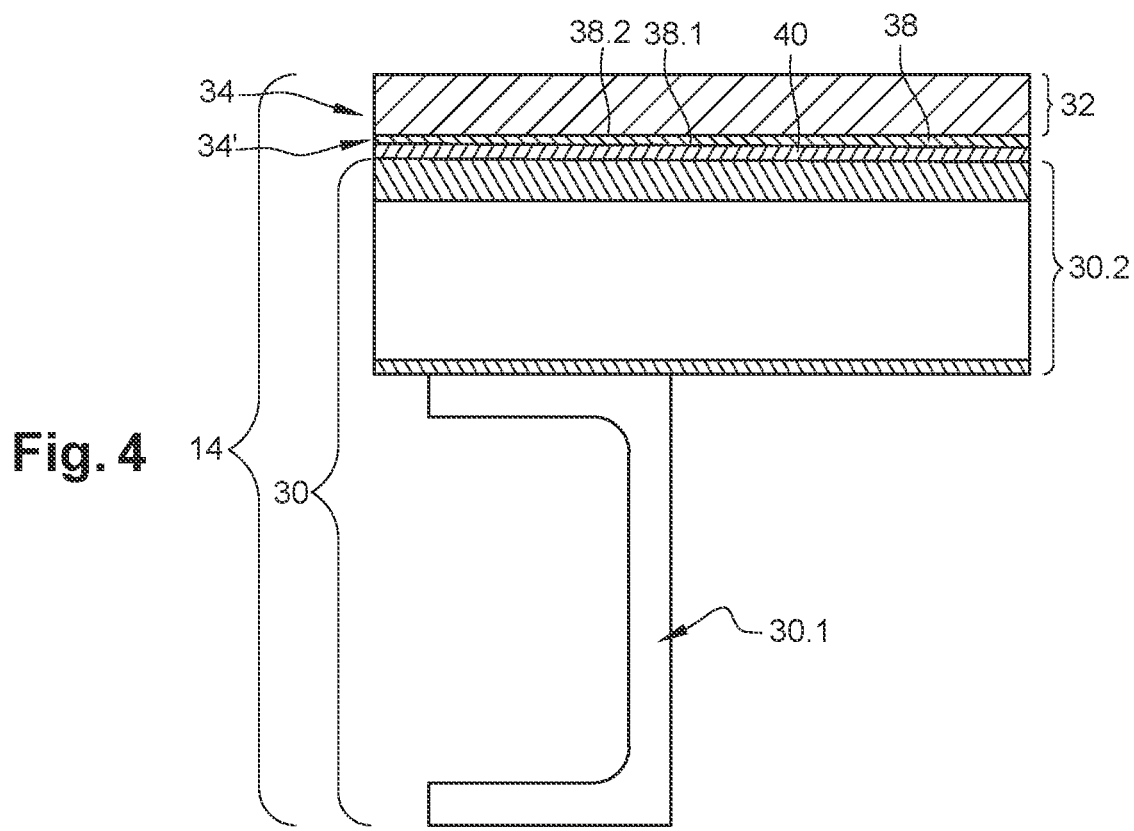
FIG. 4 is a longitudinal section through part of an aircraft floor, illustrating an embodiment of the invention.

As is illustrated in FIG. 4, the structure 30 comprises transverse beams 30.1, which are oriented perpendicularly to the longitudinal direction X and spaced apart from one another, and longitudinal reinforcements 30.2 (also called rails), which are oriented parallel to the longitudinal direction X, are spaced apart from one another and are attached to the transverse beams 30.1 and connected thereto.

Each transverse beam 30.1 has first and second ends connected to the structure of the fuselage 12.

By way of example, the transverse beams 30.1 each have a C-section, and the longitudinal reinforcements 30.2 each have an I-section.

The structure 30 of the floor 14 is not described in any more detail, since it can be identical to those of the prior art.

The deck 32 comprises an assembly of juxtaposed panels. Each panel of the deck 32 is rigid and leak tight. It can be made of various materials.

Of course, the invention is not limited to this embodiment of the deck 32.

Figure 2:
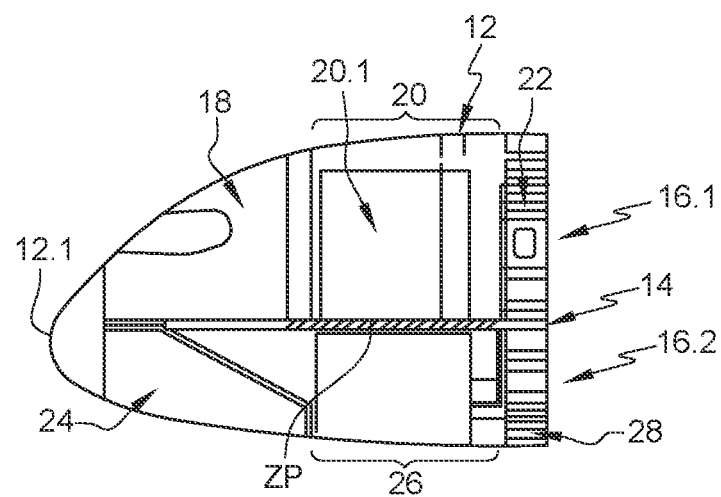
FIG. 2 is a longitudinal section through a nose cone of an aircraft.
Figure 3:
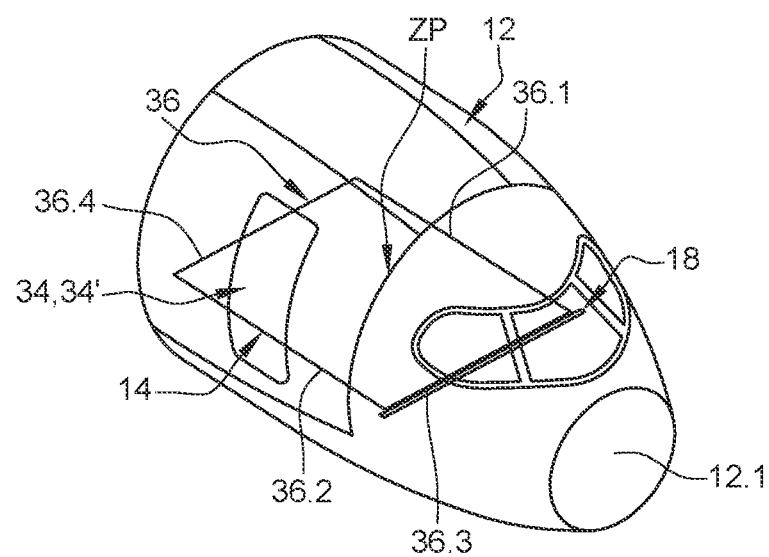
FIG. 3 is a perspective view of a nose cone of an aircraft, illustrating an embodiment of the invention.

The floor 14 comprises first and second sealing barriers 34, 34' superposed at least in line with a protection zone ZP (which can be seen in FIGS. 2 and 3). The floor 14 can comprise one or more protection zones ZP. One of them is situated above the avionics bay 26. This protection zone ZP is delimited by a perimeter 36.

According to one layout, the perimeter 36 comprises first and second longitudinal edges 36.1, 36.2, which are approximately parallel to each other and to the longitudinal direction X, and first and second transverse edges 36.3, 36.4, which are parallel to each other and perpendicular to the longitudinal direction.

The first and second longitudinal edges 36.1, 36.2 can be affixed to the fuselage 12 or can be separate from the latter.

Of course, the invention is not limited to this geometry of the protection zone ZP.

The deck 32 is configured to form the first substantially leak tight sealing barrier 34, at least in line with the protection zone ZP.

According to one configuration, the second sealing barrier 34' extends over the entire surface of the floor 14. According to another configuration, the second sealing barrier 34' extends only on the protection zone ZP. Whatever the configuration, the second sealing barrier 34' extends at least on the protection zone ZP.

According to a particular feature of the invention, the second sealing barrier 34' comprises a sealing tarpaulin 38, which is integrated in the floor 14 and positioned below the deck 32. According to one configuration, the sealing tarpaulin 38 is interposed between the deck 32 and the structure 30, as is illustrated in FIG. 4. According to one embodiment, the sealing tarpaulin 38 extends continuously over the entire protection zone ZP.

The sealing tarpaulin 38 is flexible and leak tight. According to one embodiment, the sealing tarpaulin 38 comprises at least one woven ply coated with a plastic material, such as polyvinyl chloride, polyurethane, polyethylene or the like. The woven ply can be produced from polyester fibers, glass fibers, aramid fibers or the like. Coated is understood as meaning that the plastic material is present on at least one face of the woven ply.

By way of example, the sealing tarpaulin 38 is made of the same material as the protective tarpaulins that are used to protect and close the air inlets of aircraft nacelles.

To give some order of size, the sealing tarpaulin 38 has a thickness of less than 3 mm.

For an equal surface area, the sealing tarpaulin 38 has a mass substantially less than the rigid protective plates of the prior art.

This sealing tarpaulin 38 comprises a first face 38.1 oriented toward the structure 30, and a second face 38.2 oriented toward the deck 32.

Figure 5:
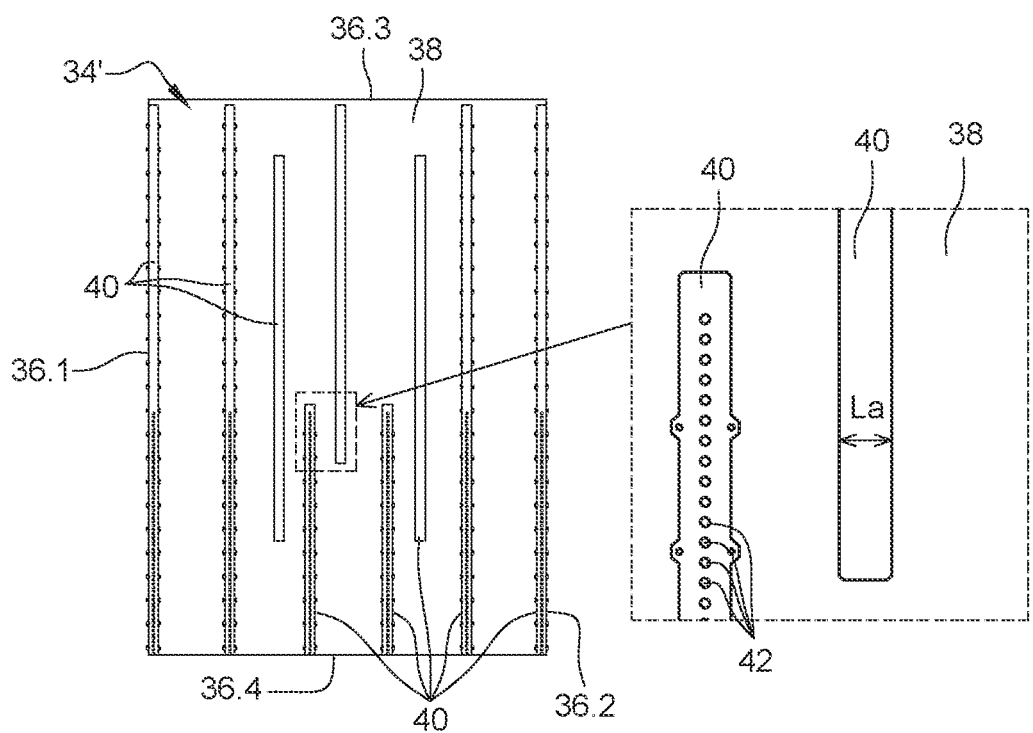
FIG. 5 is a front view of a sealing tarpaulin of an aircraft floor, illustrating an embodiment of the invention.

As is illustrated in FIG. 5, the second sealing barrier 34' comprises at least one reinforcing strip 40 applied to at least one face from the first and second faces 38.1, 38.2 of the sealing tarpaulin 38, in order to strengthen the latter.

These reinforcing strips 40 can be rigid or semi-rigid. By way of example, the reinforcing strips 40 are made of polycarbonate. They are glued to the sealing tarpaulin 38.

According to one configuration, the reinforcing strips 40 are fixed against the first face 38.1 of the sealing tarpaulin 38.

By way of example, the reinforcing strips 40 have a width La of between 2 and 10 cm and are oriented parallel to the longitudinal direction X.

Each reinforcing strip 40 has a thickness greater than that of the sealing tarpaulin 38. By way of example, each reinforcing strip 40 has a thickness of between 3 and 10 mm.

At least some of the reinforcing strips 40 are interposed between the sealing tarpaulin 38 and the longitudinal reinforcements 30.2 of the structure 30 of the floor 14.

As is illustrated in FIG. 5, at least one reinforcing strip 40 comprises through-holes 42. At least some of the through-holes 42 can be configured to accommodate fixing elements that connect the deck 32 to the structure 30.

According to one operating mode, the sealing tarpaulin 38 is attached to the structure 30 before the deck 32 is put into place.

The use of an optionally strengthened sealing tarpaulin 38 as second sealing barrier makes it possible to reduce the mass and the costs of this second sealing barrier by about 50% in relation to the protective plates of the prior art. The sealing tarpaulin 38 facilitates the mounting of the second sealing barrier and makes it possible to reduce the time of intervention on the aircraft during assembly of the latter.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft floor comprising:
    a structure,
    a deck attached to the structure, and
    first and second sealing barriers superposed at least in line with a protection zone,
    the deck being configured to form the first sealing barrier at least in line with the protection zone, the structure of the floor having transverse beams which are oriented perpendicularly to a longitudinal direction and spaced apart from one another, and longitudinal reinforcements which are oriented parallel to the longitudinal direction, are spaced apart from one another and are attached to the transverse beams, wherein the second sealing barrier comprises a sealing tarpaulin interposed between the deck and the structure and having a plurality of reinforcing strips fixed against a face of the sealing tarpaulin oriented toward the structure, wherein a portion of the reinforcing strips are interposed between the sealing tarpaulin and the longitudinal reinforcements of the structure of the floor.

2. The aircraft floor as claimed in claim 1, wherein the reinforcing strips are rigid or semi-rigid.

3. The aircraft floor as claimed in claim 1, wherein the sealing tarpaulin extends continuously over the entire protection zone.

4. The aircraft floor as claimed in claim 1, wherein the sealing tarpaulin comprises at least one woven ply coated with a plastic material.

5. The aircraft floor as claimed in claim 1, wherein at least one reinforcing strip comprises through-holes.

6. An aircraft comprising a floor as claimed in claim 1.

7. The aircraft as claimed in claim 6, wherein the aircraft comprises an avionics bay situated below the floor, the protection zone being situated above the avionics bay.

* * * * *